US011372166B2

United States Patent
Yokoi et al.

(10) Patent No.: US 11,372,166 B2
(45) Date of Patent: Jun. 28, 2022

(54) STRUCTURE FOR FIXING LIGHT GUIDING MEMBER

(71) Applicant: KABUSHIKI KAISHA TOKAI RIKA DENKI SEISAKUSHO, Aichi (JP)

(72) Inventors: Satoshi Yokoi, Aichi (JP); Kenichi Kawaguchi, Aichi (JP); Yasuo Takada, Aichi (JP); Tatsuya Nakayama, Aichi (JP); Kiyotaka Kinoshita, Aichi (JP); Atsushi Takeuchi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/135,270

(22) Filed: Dec. 28, 2020

(65) Prior Publication Data

US 2021/0223480 A1    Jul. 22, 2021

(30) Foreign Application Priority Data

Jan. 17, 2020   (JP) .............................. JP2020-006125

(51) Int. Cl.
  *G02B 6/36*    (2006.01)
  *G02B 6/38*    (2006.01)
(52) U.S. Cl.
  CPC ........... *G02B 6/3616* (2013.01); *G02B 6/389* (2013.01)
(58) Field of Classification Search
  CPC ......... G02B 6/3616; G02B 6/24; G02B 6/389
  See application file for complete search history.

(56) References Cited

U.S. PATENT DOCUMENTS

| 5,567,041 A | 10/1996 | Slocum |
| 6,749,324 B2 * | 6/2004 | Nagai ...................... B60Q 3/51 |
| | | 362/365 |
| 2015/0146433 A1 * | 5/2015 | Suzuki ................. G02B 6/0001 |
| | | 362/311.01 |
| 2018/0319322 A1 | 11/2018 | Lin |

FOREIGN PATENT DOCUMENTS

| CN | 201897123 U | 7/2011 |
| CN | 207433224 U | 6/2018 |
| JP | 2011-051500 A | 3/2011 |

* cited by examiner

*Primary Examiner* — Sung H Pak
*Assistant Examiner* — Hoang Q Tran
(74) *Attorney, Agent, or Firm* — Greenblum & Bernstein, P.L.C.

(57) ABSTRACT

A structure for fixing a light guiding member includes a light guiding member that guides light emitted from a light source to a prescribed position, a holder that holds the light guiding member, and a fixed member fixed to the light guiding member. The holder includes an insertion hole through which the light guiding member is inserted. The light guiding member includes a flange larger in outer geometry than the insertion hole and a shaft portion connected to the flange and inserted through the insertion hole. The fixed member is fixed to a portion of the shaft portion that projects from the insertion hole and larger in outer geometry than the insertion hole.

6 Claims, 7 Drawing Sheets

STRUCTURE FOR FIXING LIGHT GUIDING MEMBER

This nonprovisional application is based on Japanese Patent Application No. 2020-006125 filed with the Japan Patent Office on Jan. 17, 2020, the entire contents of which are hereby incorporated by reference.

BACKGROUND OF THE INVENTION

Field of the Invention

This disclosure relates to a structure for fixing a light guiding member.

Description of the Background Art

An illumination apparatus including a light guiding member has conventionally been known. For example, Japanese Patent Laying-Open No. 2011-51500 discloses an illumination apparatus including an LED lamp, a lens, a case, and a garnish. The case is provided with an engagement pawl and the lens is provided with an engagement hole. As the engagement pawl is engaged with the engagement hole, the lens is fixed to the case. An engagement pawl is erected on the lens. As the engagement pawl is engaged with a pawl receiver formed in the garnish, the lens is fixed to the garnish.

SUMMARY OF THE INVENTION

The illumination apparatus described in Japanese Patent Laying-Open No. 2011-51500 is structured such that the lens is fixed by engagement between the engagement pawl and the engagement hole. Therefore, there is a concern about detachment of the lens from the case or the like due to vibration or the like.

An object of the present disclosure is to provide a structure for fixing a light guiding member, the structure allowing suppression of detachment of a light guiding member from a holder.

A structure for fixing a light guiding member according to this disclosure includes a light guiding member that guides light emitted from a light source to a prescribed position, a holder that holds the light guiding member, and a fixed member fixed to the light guiding member. The holder includes an insertion hole through which the light guiding member is inserted. The light guiding member includes a flange larger in outer geometry than the insertion hole and a shaft portion connected to the flange and inserted through the insertion hole. The fixed member is fixed to a portion of the shaft portion that projects from the insertion hole and is larger in outer geometry than the insertion hole.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
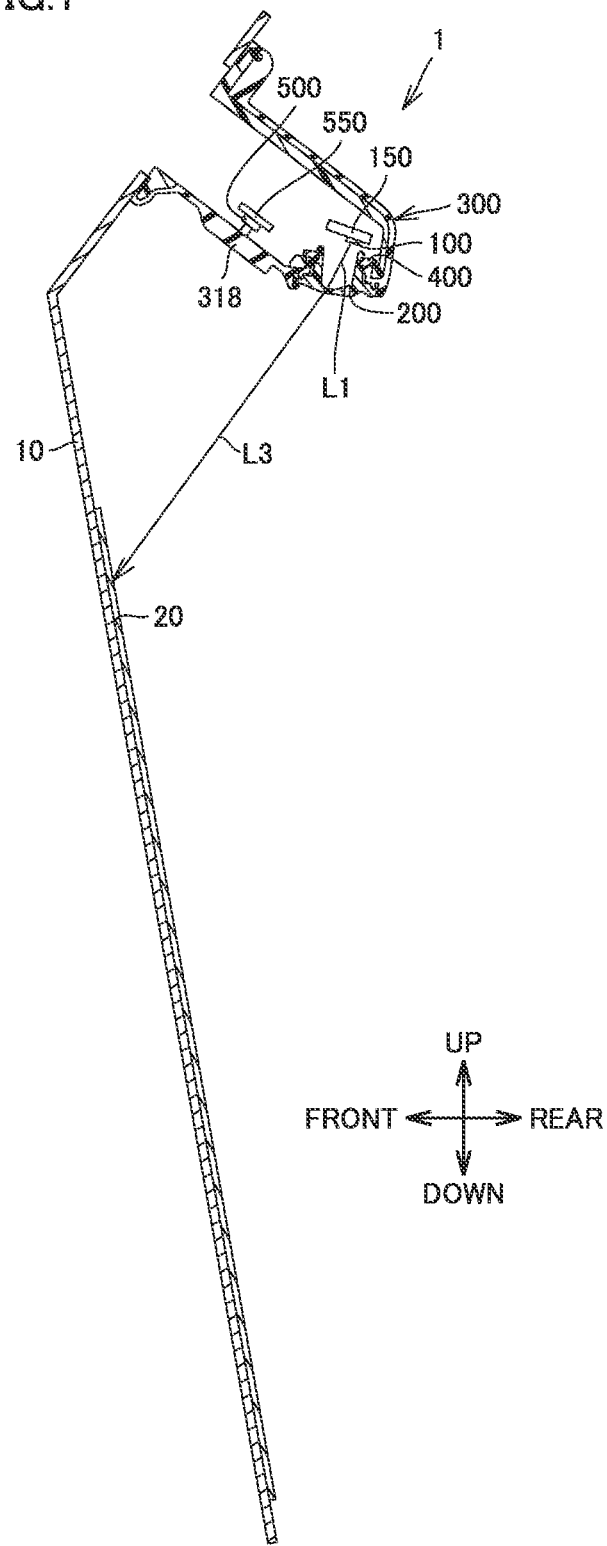
FIG. 1 is a cross-sectional view schematically showing arrangement relation between a license lamp and a license plate in one embodiment of the present disclosure.

An embodiment of the present disclosure will be described with reference to the drawings. The same or corresponding members in the drawings referred to below have the same reference characters allotted.

Figure 2:
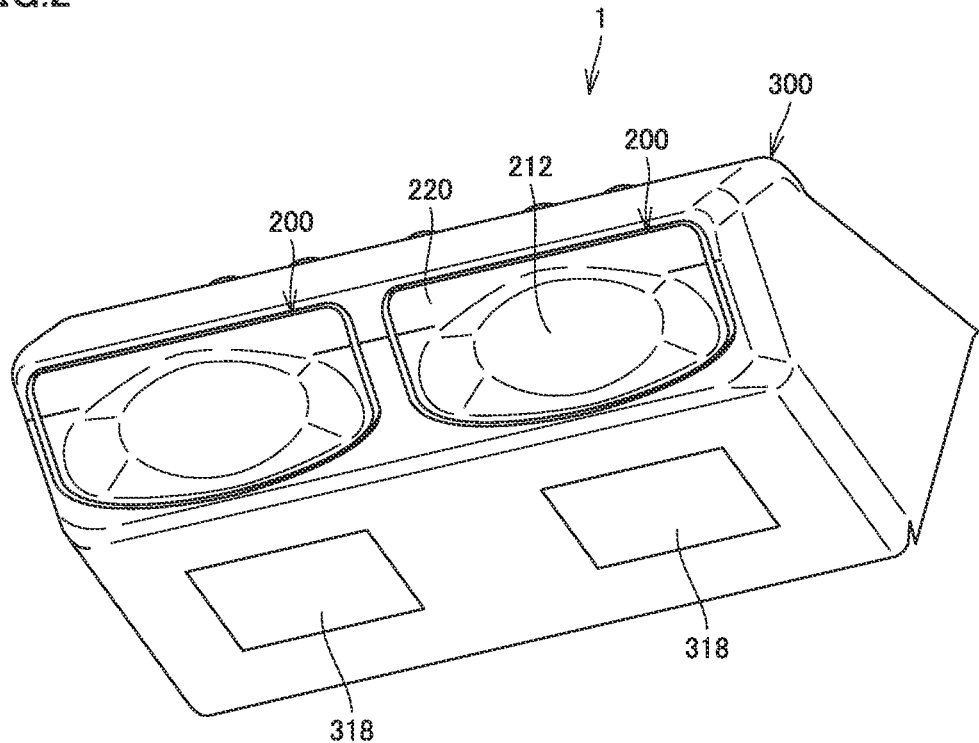
FIG. 2 is a perspective view of the license lamp shown in FIG. 1.
Figure 3:
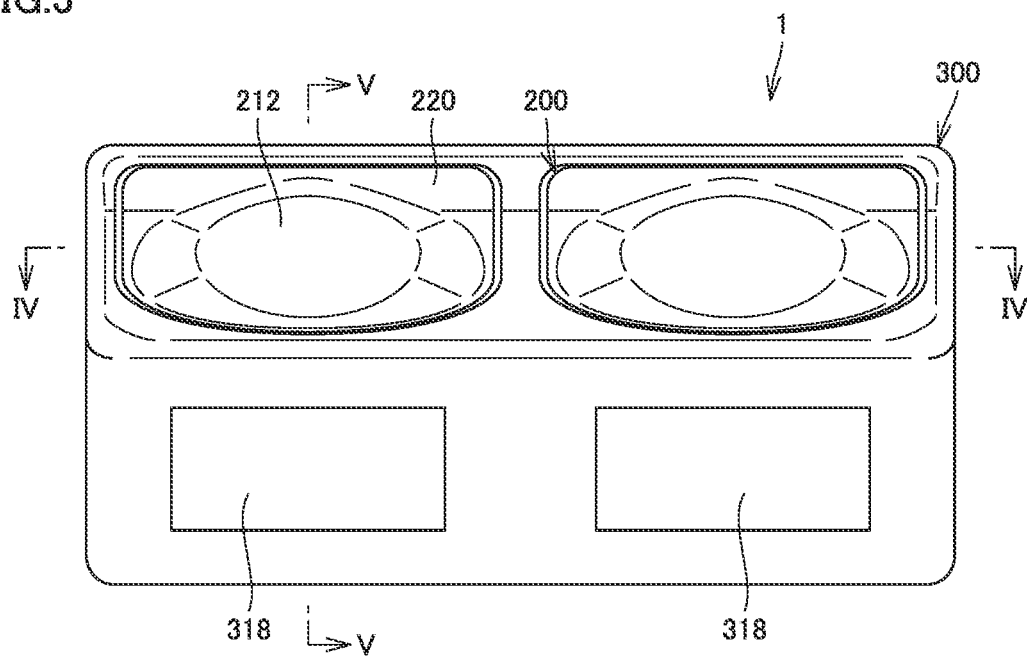
FIG. 3 is a front view of the license lamp shown in FIG. 2.
Figure 4:
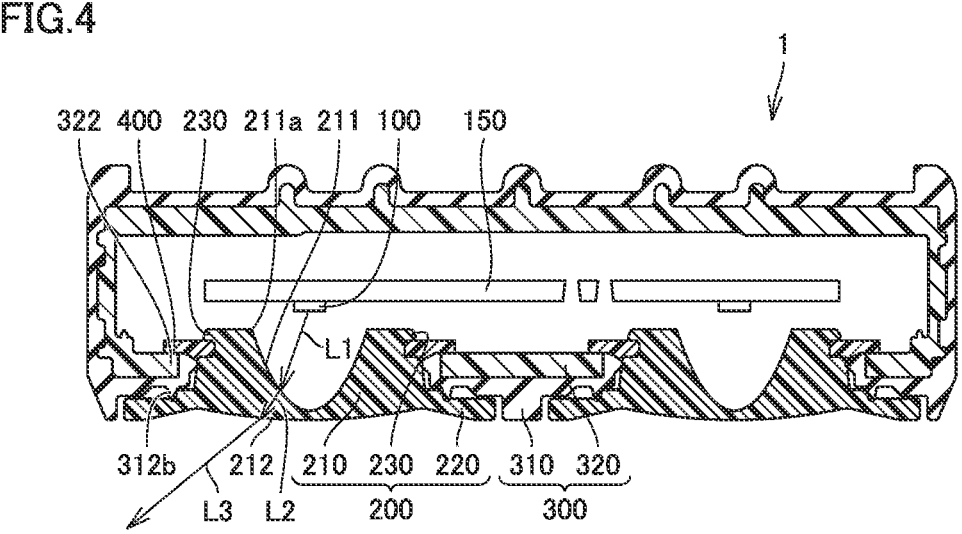
FIG. 4 is a cross-sectional view along the line IV-IV shown in FIG. 3.
Figure 5:
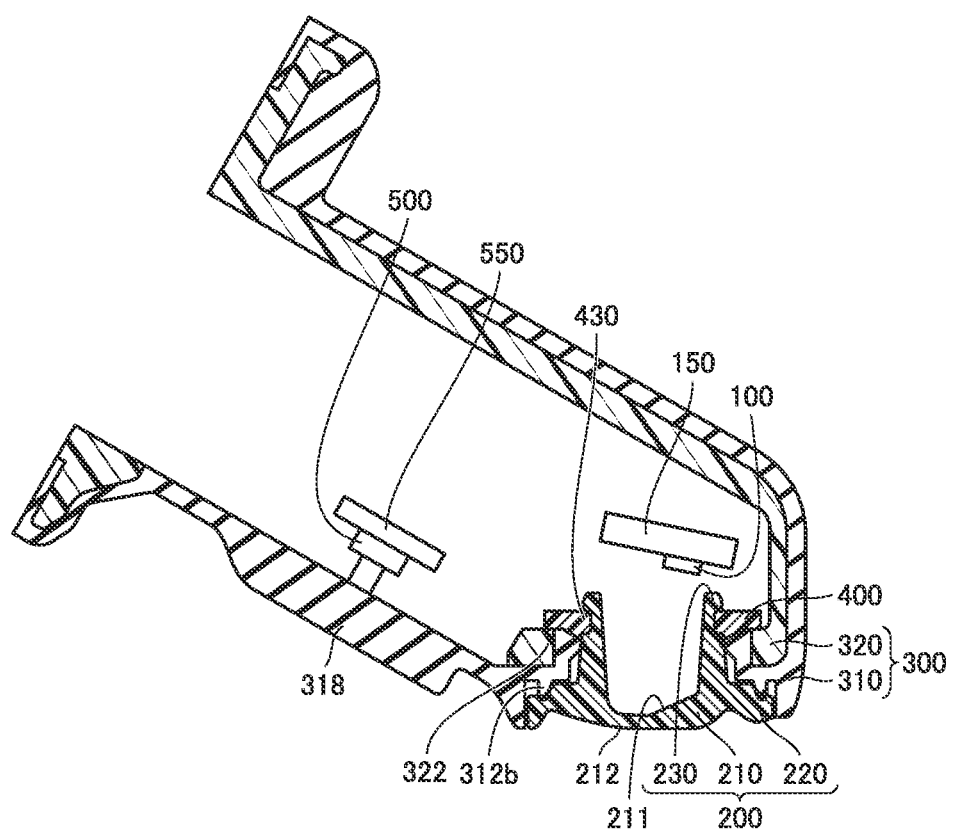
FIG. 5 is a cross-sectional view along the line V-V shown in FIG. 3.
Figure 6:
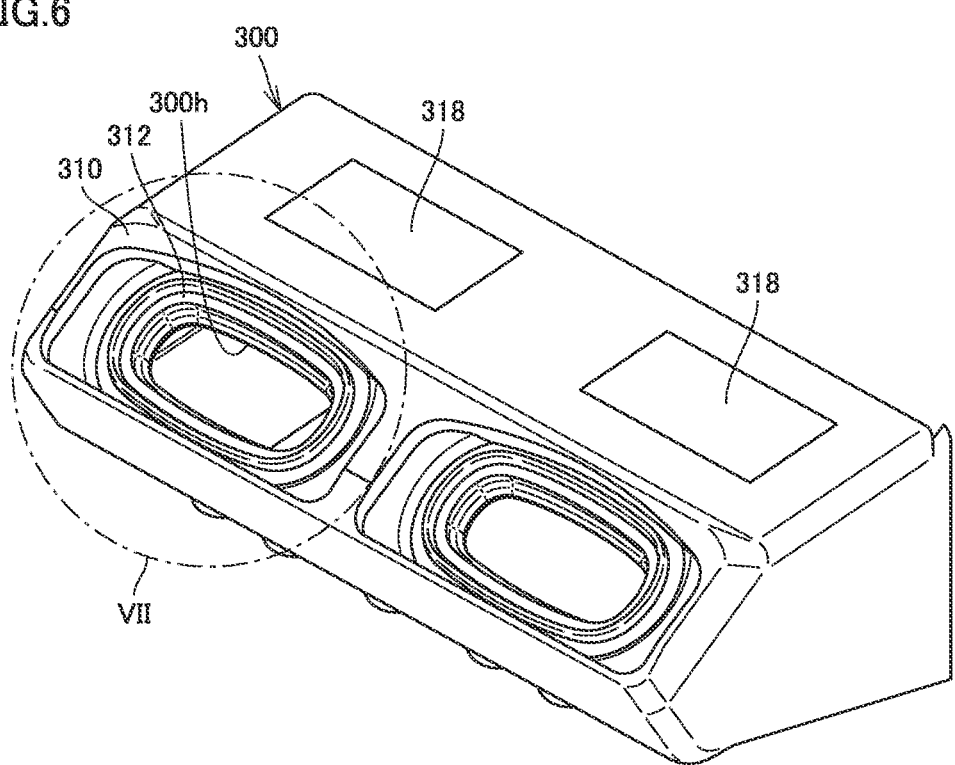
FIG. 6 is a perspective view of a holder of the license lamp.

FIG. 1 is a cross-sectional view schematically showing arrangement relation between a license lamp and a license plate in one embodiment of the present disclosure. FIG. 2 is a perspective view of the license lamp shown in FIG. 1. FIG. 3 is a front view of the license lamp shown in FIG. 2. FIG. 4 is a cross-sectional view along the line IV-IV shown in FIG. 3. FIG. 5 is a cross-sectional view along the line V-V shown in FIG. 3.

A license lamp 1 in the present embodiment is an apparatus that illuminates a license plate 20. As shown in FIG. 1, license plate 20 is attached, for example, to a back door 10 of a vehicle. License plate 20 is attached to back door 10 in such a position that a longitudinal direction thereof is in parallel to a width direction of the vehicle (a direction of depth of the sheet plane in FIG. 1). License lamp 1 is fixed above a portion of back door 10 where license plate 20 is attached.

License lamp 1 includes two light sources 100, two lenses 200, a holder 300, two fixed members 400, and two switches 500.

Light source 100 serves to illuminate license plate 20. In the present embodiment, a light emitting diode (LED) is adopted as light source 100. Each light source 100 is mounted on a substrate 150 (see FIG. 1).

As shown in FIG. 1, substrate 150 is arranged in holder 300 in such a position that light emitted from each light source 100 travels toward license plate 20 located below light source 100.

Lens 200 is a member that diffuses outgoing light L1 (see FIG. 13) emitted from light source 100. Lens 200 diffuses outgoing light L1 mainly outward in a direction orthogonal to an optical axis L0 of outgoing light L1 (the longitudinal direction of license plate 20). Lens 200 in the present embodiment particularly performs a function to diffuse light at a relatively small angle with respect to optical axis L0 of outgoing light L1 (high-luminance light in the vicinity of optical axis L0), outward in the direction orthogonal to optical axis L0. Lens 200 functions as a light guiding member that guides outgoing light L1 to a prescribed direction. Lens 200 is made of acrylic. Lens 200 includes a diffuser 210, a flange 220, and a locking portion 230.

Diffuser 210 is a portion that diffuses outgoing light L1. Diffuser 210 is formed like a shaft. Diffuser 210 includes an incident surface 211 and an emission surface 212.

Incident surface 211 is a surface through which outgoing light L1 enters lens 200. Incident surface 211 is formed at a position opposed to light source 100. Incident surface 211 refracts outgoing light L1 outward in the direction orthogonal to optical axis L0 (a lateral direction in FIG. 11), with respect to optical axis L0 of the outgoing light. Specifically, as shown in FIGS. 4 and 11, incident surface 211 is in a shape convexly curved toward emission surface 212 (in a direction away from light source 100).

Figure 8:
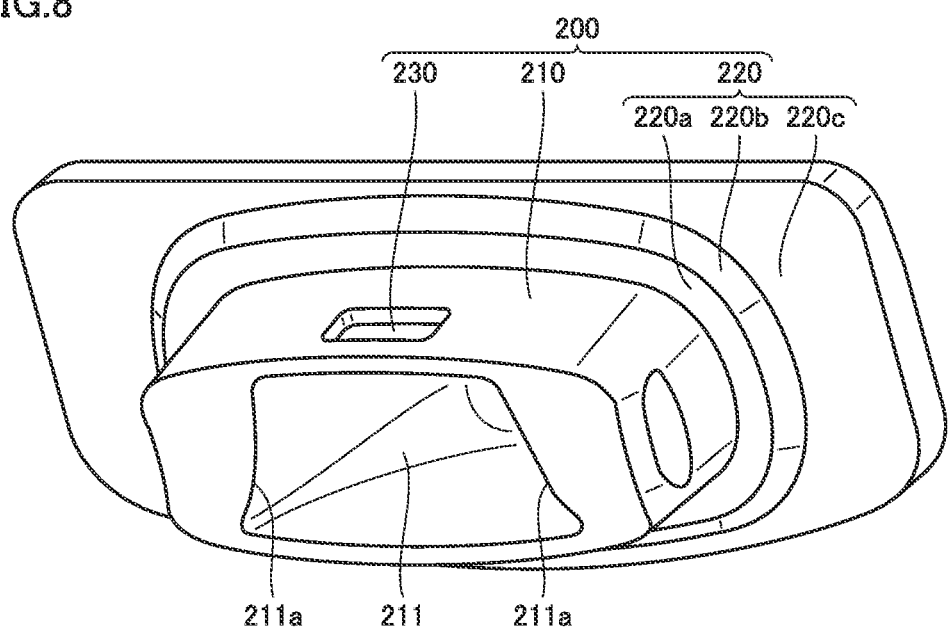
FIG. 8 is a perspective view of a lens.
Figure 9:
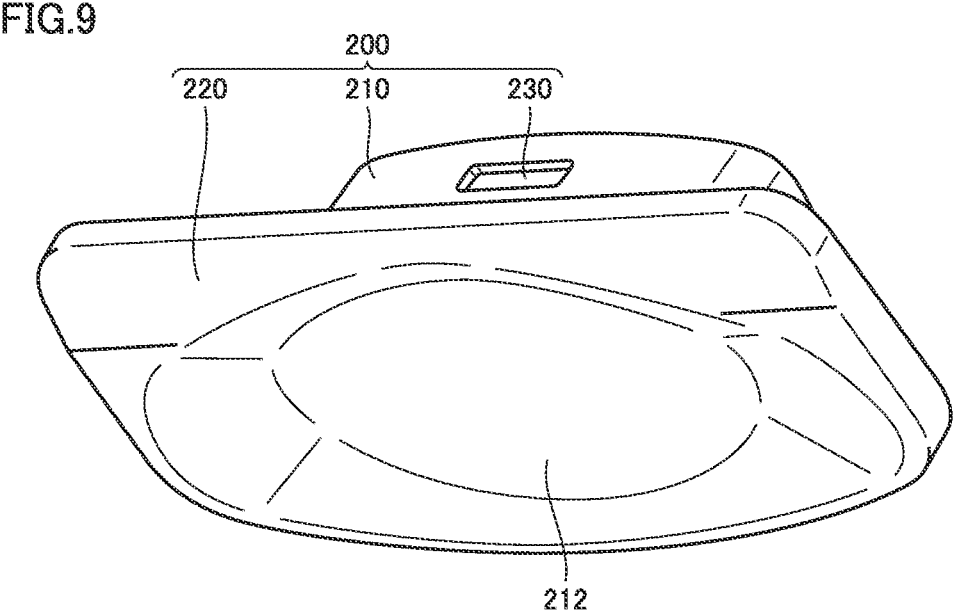
FIG. 9 is a perspective view of the lens at an angle different from the angle in FIG. 8.
Figure 10:
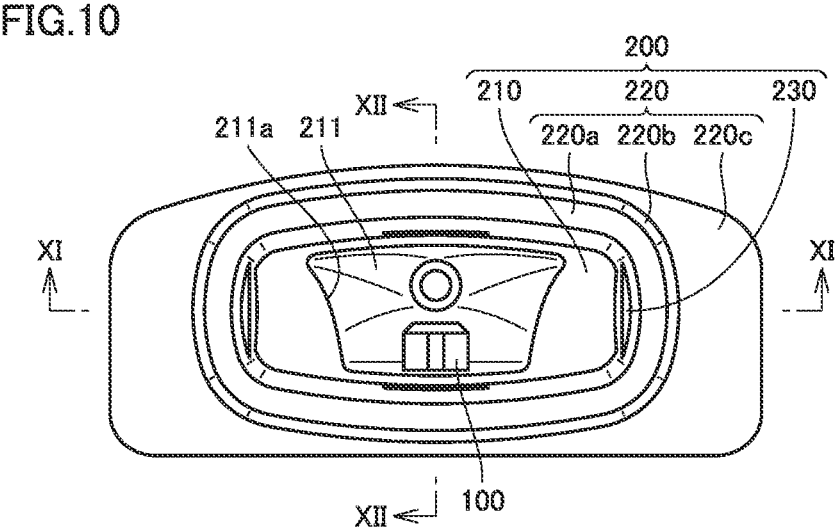
FIG. 10 is a plan view of the lens and a light source.

Incident surface 211 includes an end incident portion 211a. End incident portion 211a is formed at opposing ends in an orthogonal direction (the lateral direction in FIG. 10) orthogonal to a direction of connection between incident surface 211 and emission surface 212. As shown in FIGS. 8 and 10, end incident portion 211a is in a shape curved convexly inward in the orthogonal direction.

Emission surface 212 is a surface where incident light L2 (see FIG. 13) incident on incident surface 211 exits from lens 200. Emission surface 212 is formed from a surface of diffuser 210 opposite to incident surface 211. Emission surface 212 refracts incident light L2 outward in a direction orthogonal to a centerline of incident light L2, with respect to the centerline of the incident light. Specifically, as shown in FIGS. 4 and 11, emission surface 212 is in a shape convexly curved in a direction away from incident surface 211. Emission surface 212 is smaller in curvature than incident surface 211. Emission surface 212 includes a main surface. An incident angle of incident light L2 with respect to the main surface is set to a critical angle (approximately 42 degrees in the present embodiment).

Figure 11:
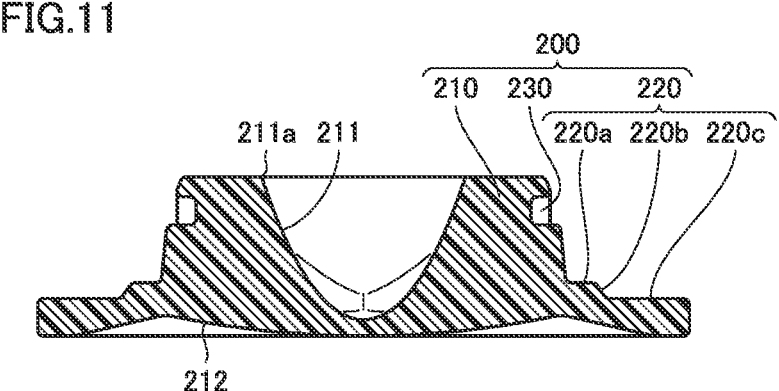
FIG. 11 is a cross-sectional view along the line XI-XI shown in FIG. 10.

Flange 220 is in a shape protruding outward from a tip end (a lower end in FIG. 11) of diffuser 210 in a direction from incident surface 211 toward emission surface 212 (downward in FIG. 11). A direction from incident surface 211 toward emission surface 212 is denoted as a "light travel direction" below. As shown in FIGS. 8 and 10, flange 220 is formed in an annular shape continuous in a circumferential direction of diffuser 210. Flange 220 includes an inner annular portion 220a, a pressing portion 220b, and an outer annular portion 220c.

Inner annular portion 220a is formed on a surface (an upper surface in FIG. 11) of flange 220 in a direction opposite to the light travel direction (downward in FIG. 11). Inner annular portion 220a is in a shape protruding outward from an outer circumferential surface of diffuser 210 and surrounding diffuser 210. Inner annular portion 220a is formed as being flat.

Figure 12:
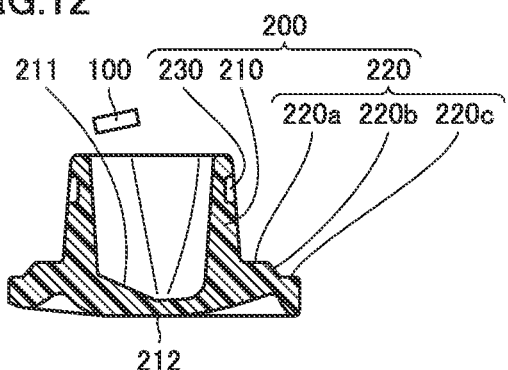
FIG. 12 is a cross-sectional view along the line XII-XII shown in FIG. 10.

Pressing portion 220b is in a shape protruding outward from an outer periphery of inner annular portion 220a and surrounding inner annular portion 220a. As shown in FIGS. 11 and 12, pressing portion 220b is in a shape inclined in the light travel direction as it is more distant from inner annular portion 220a.

Outer annular portion 220c is in a shape protruding outward from an outer periphery of pressing portion 220b and surrounding pressing portion 220b. Outer annular portion 220c is formed as being flat.

Locking portion 230 is provided in the outer circumferential surface of diffuser 210. Locking portion 230 is a portion where fixed member 400 is locked. In the present embodiment, locking portion 230 is in a shape projecting outward from the outer circumferential surface of diffuser 210.

Holder 300 is a member that holds light source 100 and lens 200. Holder 300 holds light source 100 and lens 200 such that outgoing light L1 enters incident surface 211 and illumination light L3 that exits from emission surface 212 illuminates license plate 20.

Holder 300 includes an insertion hole 300h through which diffuser 210 is inserted. Holder 300 holds lens 200 while diffuser 210 is located in insertion hole 300h. Namely, diffuser 210 forms a shaft portion inserted through insertion hole 300h. Flange 220 is larger in outer geometry than insertion hole 300h. Holder 300 and lens 200 define an accommodation space. Light source 100, substrate 150, switch 500, and the like are arranged in the accommodation space.

Holder 300 includes a low rigidity portion 310 and a high rigidity portion 320.

Low rigidity portion 310 is made, for example, of thermoplastic elastomer. Low rigidity portion 310 includes a flange receiving portion 312, a holding portion 314, an adjacent portion 316, and an operation portion 318.

Figure 7:
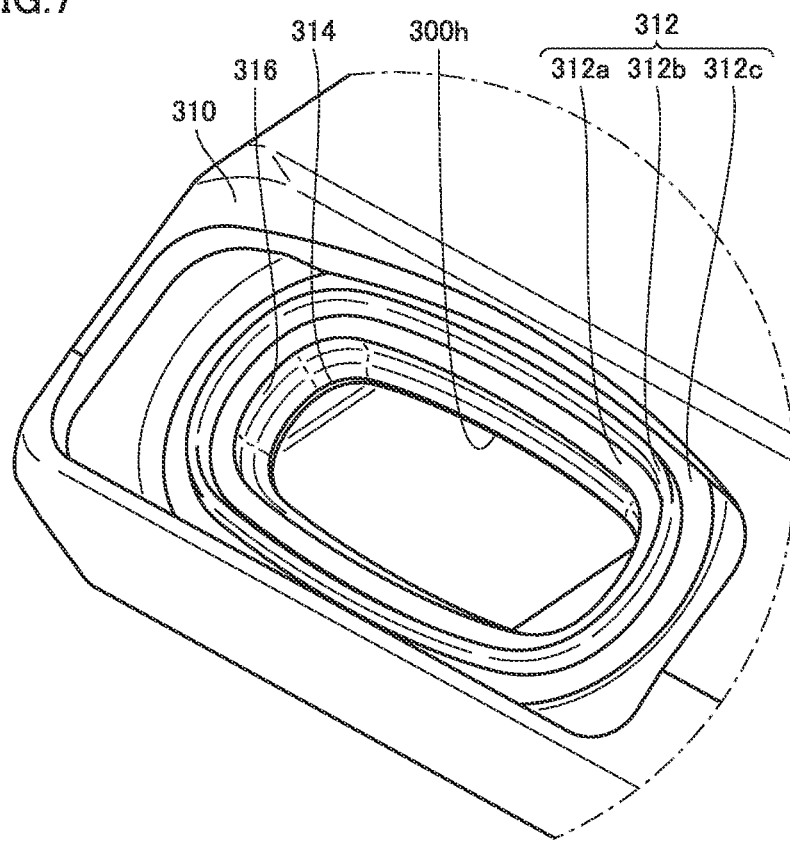
FIG. 7 is an enlarged view of an area shown with a solid line VII in FIG. 6.

Flange receiving portion 312 is a portion that receives flange 220. As shown in FIG. 7, flange receiving portion 312 includes an inner receiving portion 312a, an annular rib 312b, and an outer receiving portion 312c.

Inner receiving portion 312a receives inner annular portion 220a. Inner receiving portion 312a is formed in an annular shape that surrounds insertion hole 300h. Inner receiving portion 312a is formed as being flat.

Annular rib 312b is in a shape erected from an outer periphery of inner receiving portion 312a and surrounding inner receiving portion 312a. Annular rib 312b is in a shape surrounding the entire circumference of insertion hole 300h and projecting toward flange 220.

Figure 13:
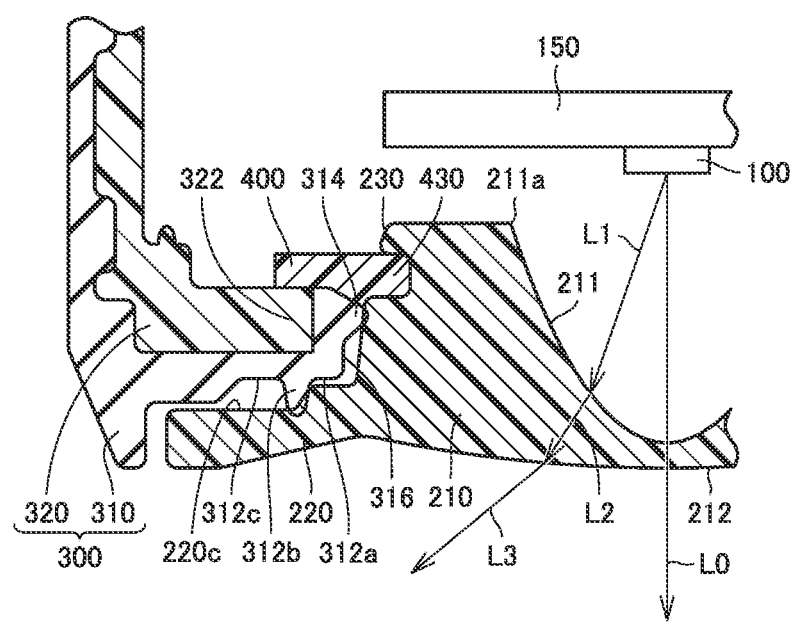
FIG. 13 is a diagram schematically showing an exemplary path of outgoing light.

Outer receiving portion 312c is in a shape protruding outward from an outer periphery of annular rib 312b and surrounding annular rib 312b. Outer receiving portion 312c is formed as being flat. As shown in FIG. 13, a distance between outer receiving portion 312c and the top of annular rib 312b is longer than a distance between inner receiving portion 312a and the top of annular rib 312b. Namely, outer receiving portion 312c is formed at a position that retracts from inner receiving portion 312a in a direction opposite to the light travel direction. Therefore, a space allowing tilt of annular rib 312b is defined between outer receiving portion 312c and outer annular portion 220c.

Holding portion 314 defines a part of insertion hole 300h. Holding portion 314 holds diffuser 210 as being in intimate contact with the outer circumferential surface of diffuser 210. In other words, diffuser 210 is pressed into holding portion 314. A gap between holding portion 314 and diffuser 210 is thus sealed. Holding portion 314 holds diffuser 210 as being in intimate contact with the outer circumferential surface of diffuser 210 so as to maintain a state that pressing portion 220b presses annular rib 312b (a state that annular rib 312b is in intimate contact with pressing portion 220b). Namely, the gap between lens 200 and holder 300 is sealed at two points.

Adjacent portion 316 defines the remainder of insertion hole 300h. Adjacent portion 316 is formed at a position adjacent to holding portion 314 in an axial direction of diffuser 210. Adjacent portion 316 defines a space between adjacent portion 316 and the outer circumferential surface of diffuser 210. The space accepts a part of holding portion 314 that deforms at the time of pressing of diffuser 210 into holding portion 314. The tip end of adjacent portion 316 in the light travel direction is continuous to an inner end of inner receiving portion 312a.

Adjacent portion 316 does not have to be provided. In this case, holding portion 314 forms the entire portion that defines insertion hole 300h.

Operation portion 318 is a portion for operating switch 500. As shown in FIG. 1, operation portion 318 is formed at a position adjacent to holding portion 314.

Switch 500 is arranged at a position where pressing of operation portion 318 can be sensed. Switch 500 is operated to open back door 10. As shown in FIG. 1, switch 500 is mounted on a substrate 550. Substrate 550 is arranged in the accommodation space.

High rigidity portion 320 is higher in rigidity than low rigidity portion 310. High rigidity portion 320 is made, for example, of polypropylene. As shown in FIGS. 4 and 5, high rigidity portion 320 supports a part of low rigidity portion 310 from an inner side thereof. In other words, the surface of high rigidity portion 320 is covered with low rigidity portion 310. High rigidity portion 320 is formed integrally with low rigidity portion 310 by two-color molding or the like. High rigidity portion 320 supports a portion of low rigidity portion 310 other than holding portion 314 and operation portion 318.

Fixed member 400 is a member fixed to a portion projecting from insertion hole 300h, of diffuser 210 that forms the shaft portion. Fixed member 400 is made of a resin or the like. Fixed member 400 is formed in an annular shape that surrounds diffuser 210. As shown in FIGS. 4, 5, and 13, fixed member 400 includes a locked portion 430 engaged with locking portion 230. In the present embodiment, locked portion 430 is provided as a recess that can accept locking portion 230.

As shown in FIGS. 4, 5, and 13, an outer periphery of fixed member 400 is in contact with high rigidity portion 320. Namely, high rigidity portion 320 includes a fixed member receiving portion 322 that receives fixed member 400.

As set forth above, lens 200 of license lamp 1 in the present embodiment refracts at incident surface 211, outgoing light L1 outward in the direction orthogonal to optical axis L0 and refracts at emission surface 212, incident light L2 outward in the direction orthogonal to the centerline of incident light L2, with respect to the centerline of the incident light. Therefore, outgoing light L1 emitted from light source 100 is diffused over a wide range. Therefore, license plate 20 is illuminated over a wide range.

It should be understood that the embodiment disclosed herein is illustrative and non-restrictive in every respect. The scope of the present disclosure is defined by the terms of the claims rather than the description of the embodiment above, and is intended to include any modifications within the scope and meaning equivalent to the terms of the claims.

For example, a water shut-off structure that suppresses entry of water into holder 300 by annular rib 312b and flange 220 can be applied also to a component other than license lamp 1. In the water shut-off structure, a member held by holder 300 is not limited to lens 200 that functions as the light guiding member.

A fixing structure for fixing lens 200 functioning as the light guiding member to holder 300 by clamping holder 300 between flange 220 and fixed member 400 can be applied also to a component other than license lamp 1. In the fixing structure, the light guiding member held by holder 300 is not limited to lens 200.

An exemplary embodiment described above represents a specific example of an aspect below.

A lens according to one aspect is a lens that diffuses outgoing light emitted from a light source. The lens includes an incident surface through which the outgoing light enters the lens, the incident surface being formed at a portion opposed to the light source, and an emission surface through which incident light incident on the incident surface exits from the lens. The incident surface refracts the outgoing light outward in a direction orthogonal to an optical axis of outgoing light, with respect to the optical axis of the outgoing light. The emission surface refracts the incident light outward in a direction orthogonal to a centerline of the incident light, with respect to the centerline of the incident light.

In this lens, outgoing light is refracted at the incident surface outward in the direction orthogonal to the optical axis and incident light is refracted at the emission surface outward in the direction orthogonal to the centerline of incident light, with respect to the centerline. Therefore, outgoing light emitted from the light source is diffused over a wide range.

Preferably, the incident surface is in a shape convexly curved toward the emission surface and the emission surface is in a shape convexly curved in a direction away from the incident surface.

The effect above is thus advantageously achieved.

In this case, preferably, the incident surface is larger in curvature than the emission surface.

Preferably, the emission surface includes a main surface and an incident angle of the incident light with respect to the main surface is set to a critical angle.

Incident light is thus diffused over a wider range when incident light exits from the emission surface.

Preferably, the incident surface includes an end incident portion formed at opposing ends in an orthogonal direction orthogonal to a direction of connection between the incident surface and the emission surface and the end incident portion is in a shape convexly curved inward in the orthogonal direction.

Illumination light that exits from the emission surface is thus effectively diffused in a front-rear direction of the vehicle. Therefore, an illuminated range of the license plate in the front-rear direction of the vehicle is larger.

A license lamp according to one aspect is a license lamp that illuminates a license plate attached to a vehicle. The license lamp includes a light source for illuminating the license plate, the lens, and a holder that holds the light source and the lens. The holder holds the light source and the lens such that outgoing light emitted from the light source is incident on the incident surface of the lens and illumination light that exits from the emission surface illuminates the license plate.

Preferably, the license lamp further includes a switch that is fixed within the holder and operated to open a back door of the vehicle.

A structure for fixing a light guiding member according to one aspect includes a light guiding member that guides light emitted from a light source to a prescribed position, a holder that holds the light guiding member, and a fixed member fixed to the light guiding member. The holder includes an insertion hole through which the light guiding member is inserted. The light guiding member includes a flange larger in outer geometry than the insertion hole and a shaft portion connected to the flange and inserted through the insertion hole. The fixed member is fixed to a portion of the shaft portion that projects from the insertion hole and is larger in outer geometry than the insertion hole.

In the structure for fixing the light guiding member, the light guiding member includes the flange larger in outer geometry than the insertion hole and the fixed member larger in outer geometry than the insertion hole is fixed to a portion projecting from the insertion hole, of the shaft portion of the light guiding member. In other words, the holder is clamped between the flange larger in outer geometry than the insertion hole and the fixed member. Therefore, detachment of the light guiding member from the holder is suppressed.

Preferably, the holder includes a holding portion that defines at least a part of the insertion hole and holds the shaft portion while the holder is in intimate contact with an outer circumferential surface of the shaft portion.

A gap between the shaft portion and the holding portion is thus effectively sealed.

In this case, preferably, the holder includes a low rigidity portion including a flange receiving portion that receives the flange and a high rigidity portion that is higher in rigidity than the low rigidity portion and supports the low rigidity portion. The holding portion is formed from a part of the low rigidity portion.

In this aspect, for example, when external force is applied to the light guiding member, the high rigidity portion supports the low rigidity portion. Therefore, deformation of the entire holder is suppressed. In addition, since the holding portion is formed from a part of the low rigidity portion, a state of intimate contact between the shaft portion and the holding portion is effectively secured.

Preferably, the holder further includes an adjacent portion that defines a part of the insertion hole and is adjacent to the holding portion in an axial direction of the shaft portion, and the adjacent portion defines a space between the adjacent portion and an outer circumferential surface of the shaft portion.

In this aspect, a portion of the low rigidity portion that forms the holding portion is moved into the space at the time when the shaft portion is inserted in the insertion hole. Therefore, resistance of insertion of the light guiding member into the insertion hole is reduced.

Preferably, the high rigidity portion includes a fixed member receiving portion that receives the fixed member.

Thus, when external force in a direction in which the shaft portion of the light guiding member comes out of the insertion hole is applied to the light guiding member, the fixed member is received by the fixed member receiving portion of the high rigidity portion. Therefore, deformation of the holding portion or a portion in the vicinity thereof is suppressed. Therefore, sealing between the shaft portion and the holding portion is more reliably maintained.

Preferably, the light guiding member includes a locking portion that locks the fixed member and the fixed member includes a locked portion engaged with the locking portion.

A water shut-off structure according to one aspect includes a member and a holder that holds the member. The holder includes an insertion hole through which the member is inserted. The member includes a flange larger in outer geometry than the insertion hole and a shaft portion connected to the flange and inserted through the insertion hole. The holder includes a flange receiving portion that receives the flange. The flange receiving portion includes an annular rib in a shape surrounding the entire circumference of the insertion hole and projecting toward the flange.

In this water shut-off structure, the annular rib comes in contact with the flange around the entire circumference of the insertion hole. Therefore, entry of water into the insertion hole from between the flange and the flange receiving portion is suppressed.

Preferably, the flange includes a pressing portion that presses the annular rib in a direction away from the insertion hole.

In this aspect, the pressing portion presses the annular rib in a radially outward direction of the annular rib. Therefore, the annular rib is in intimate contact with the pressing portion while it is tilted outward. When water enters a gap between the flange and the flange receiving portion in this state, force in a direction to press the annular rib against the pressing portion is applied to the annular rib. Therefore, sealability between the flange and the flange receiving portion is enhanced.

Preferably, the flange receiving portion includes an inner receiving portion formed on an inner side of the annular rib and an outer receiving portion formed on an outer side of the annular rib, and a distance between the outer receiving portion and a top of the annular rib is longer than a distance between the inner receiving portion and the top of the annular rib.

Thus, the annular rib tends to be tilted outward when the pressing portion presses the annular rib.

Preferably, the holder includes a holding portion that holds the shaft portion while it is in intimate contact with an outer circumferential surface of the shaft portion so as to maintain a state that the pressing portion presses the annular rib.

In this aspect, in addition to the gap between the flange and the flange receiving portion, a gap between the insertion hole and the shaft portion is also sealed.

Preferably, the member is a lens that diffuses outgoing light emitted from a light source for illuminating a license plate attached to a vehicle and the holder can be fixed to the vehicle while it holds the member.

What is claimed is:

1. A structure for fixing a light guiding member, the structure comprising:
    a light guiding member that guides light emitted from a light source to a prescribed position;
    a holder that holds the light guiding member; and
    a fixed member fixed to the light guiding member,
    the holder including an insertion hole through which the light guiding member is inserted,
    the light guiding member including
        a flange larger in outer geometry than the insertion hole, and
        a shaft portion connected to the flange and inserted through the insertion hole, the shaft portion including a projecting portion that projects from the insertion hole on a side opposite to a side on which the flange is located,
    the fixed member being fixed to the projecting portion of the shaft portion and being larger in outer geometry than the insertion hole, and
    the flange and the fixed member clamping the holder.

2. The structure for fixing a light guiding member according to claim 1,
    wherein the holder includes a holding portion that defines at least a part of the insertion hole and holds the shaft portion while the holder is in intimate contact with an outer circumferential surface of the shaft portion.

3. The structure for fixing a light guiding member according to claim 2,
    wherein the holder includes a low rigidity portion including a flange receiving portion that receives the flange, and
a high rigidity portion that is higher in rigidity than the low rigidity portion and supports the low rigidity portion, and
the holding portion is formed from a part of the low rigidity portion.

4. The structure for fixing a light guiding member according to claim 3,
wherein the holder further includes an adjacent portion that defines a part of the insertion hole and is adjacent to the holding portion in an axial direction of the shaft portion, and
the adjacent portion defines a space between the adjacent portion and an outer circumferential surface of the shaft portion.

5. The structure for fixing a light guiding member according to claim 3,
wherein the high rigidity portion includes a fixed member receiving portion that receives the fixed member.

6. The structure for fixing a light guiding member according to claim 1,
wherein the light guiding member includes a locking portion that locks the fixed member, and
the fixed member includes a locked portion engaged with the locking portion.

* * * * *